United States Patent
Lu

(10) Patent No.: US 9,008,003 B2
(45) Date of Patent: Apr. 14, 2015

(54) METHOD FOR NEGOTIATING THE MAXIMUM RESOURCE FOR SHARING IN OFDMA-BASED COMMUNICATIONS SYSTEM

(75) Inventor: Jianmin Lu, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 1938 days.

(21) Appl. No.: 11/941,823

(22) Filed: Nov. 16, 2007

(65) Prior Publication Data

US 2008/0137597 A1 Jun. 12, 2008

Related U.S. Application Data

(60) Provisional application No. 60/869,171, filed on Dec. 8, 2006.

(51) Int. Cl.
*H04W 4/00* (2009.01)
*H04W 72/00* (2009.01)
*H04W 72/04* (2009.01)
*H04W 72/12* (2009.01)

(52) U.S. Cl.
CPC ...... *H04W 72/0493* (2013.01); *H04W 72/0406* (2013.01); *H04W 72/121* (2013.01)

(58) Field of Classification Search
CPC .......... H04W 72/121; H04W 72/0493; H04W 72/0406
USPC ................................ 370/329; 455/450, 452.1
See application file for complete search history.

(56) References Cited

U.S. PATENT DOCUMENTS

| | | | |
|---|---|---|---|
| 4,837,858 A | 6/1989 | Ablay et al. | |
| 2001/0033560 A1 | 10/2001 | Tong et al. | |
| 2001/0053141 A1 | 12/2001 | Periyalwar et al. | |
| 2002/0151321 A1 | 10/2002 | Winchell et al. | |
| 2007/0121543 A1 | 5/2007 | Kuchibhotla et al. | |
| 2007/0230412 A1 | 10/2007 | McBeath et al. | |
| 2007/0274288 A1* | 11/2007 | Smith et al. | 370/351 |
| 2008/0025247 A1 | 1/2008 | McBeath et al. | |
| 2008/0025337 A1 | 1/2008 | Smith et al. | |
| 2008/0037496 A1* | 2/2008 | Smith et al. | 370/340 |
| 2008/0049692 A1 | 2/2008 | Bachu et al. | |
| 2008/0062178 A1* | 3/2008 | Khandekar et al. | 345/440 |
| 2008/0089354 A1 | 4/2008 | Yoon et al. | |
| 2008/0095071 A1* | 4/2008 | Lu et al. | 370/254 |
| 2008/0310528 A1* | 12/2008 | Soong et al. | 375/260 |
| 2009/0022098 A1* | 1/2009 | Novak et al. | 370/329 |

OTHER PUBLICATIONS

Bi, H., et al., "Resource Management in VoIP Support," 3rd Generation Partnership Project 2 "3GPP2", C30-20060424-036, Apr. 24, 2006, pp. 1-6, Motorola, Inc.

(Continued)

*Primary Examiner* — Steven H Nguyen
(74) *Attorney, Agent, or Firm* — Slater & Matsil, L.L.P.

(57) ABSTRACT

A method for resource allocation in a wireless communications network and the respective wireless communications system are provided. The method includes providing an access network; providing an access terminal; joining the access terminal into a group of the access network, wherein access terminals in the group share a group of resources; and setting a maximum usable channel size for the access terminal, wherein the maximum usable channel size limits a maximum number of leftover resources used by the access terminal.

27 Claims, 2 Drawing Sheets

AT PRESENT BITMAP

50 → | 0 | 1 | 0 | 1 | 0 | 0 | 0 | 0 |

ALLOCATION SIZE BITMAP

52 → | 0 | 1 | 0 | 0 | 1 | 0 | 0 | 0 |

ALLOCATION SIZE BITMAP

54 → | 0 | 1 | 1 | 0 | 0 | 0 | 0 | 0 |

(56) References Cited

OTHER PUBLICATIONS

McBeath, S., et al., "Call Grouping using Bitmap," 3rd Generation Partnership Project 2 "3GPP2", C30-20060731-023, Jul. 31, 2006, pp. 1-3, Motorola, Inc.

Bi, H., et al., "Group Resource Allocation Enhancements," 3rd Generation Partnership Project 2 "3GPP2", C30-20060911-102, Sep. 11, 2006, pp. 1-9, Motorola, Inc.

Bi, H., et al., "Sharing Persistent Assignments in the Group Resource Allocation," 3rd Generation Partnership Project 2 "3GPP2", C30-20060911-100, Sep. 11, 2006, pp. 1-4 Motorola, Inc.

Novak, R., et al., "Group Resource Allocation Bitmap Signaling Enhancement," 3rd Generation Partnership Project 2 "3GPP2", C030-20060911-045, Sep. 11, 2006, pp. 1-9, Nortel.

Reed, D., et al., "Reverse Link with VoIP with Group Scheduling," 3rd Generation Partnership Project 2 "3GPP2", C30-20060911-103, Sep. 11, 2006, pp. 1-5, Motorola.

Soong, A., et al., "Resource Sharing in VoIP Group for LBC," 3rd Generation Partnership Project 2 "3GPP2", 3GPP2-C30-20060911-028, Sep. 11, 2006, pp. 1-8, Huawei Technologies Co., Ltd.

Zhouyue, P., et al., "VoIP Group Enhancements," C30-20060911-114, Sep. 11, 2006, pp. 1-4, Samsung.

"Group Resource Allocation Components Proposal," 3rd Generation Partnership Project 2 "3GPP2", C30-20061204-089, Dec. 4, 2006, pp. 1-21, Huawei Technologies Co., Ltd., et al.

\* cited by examiner

METHOD FOR NEGOTIATING THE MAXIMUM RESOURCE FOR SHARING IN OFDMA-BASED COMMUNICATIONS SYSTEM

CROSS REFERENCES

This application claims the benefit of the commonly assigned U.S. Patent application: Provisional Application Ser. No. 60/869,171, filed on Dec. 8, 2006, entitled "Method for Negotiating the Maximum Resource for Sharing in OFDMA-Based Communication System," and is related to commonly assigned U.S. patent application: Non-provisional application Ser. No. 11/776,326, filed Jul. 11, 2007, entitled "Method and System for Sharing Resources in a Wireless Communication Network," which patent applications are incorporated herein by reference.

TECHNICAL FIELD

This invention relates generally to allocation of radio resources for transmission in a wireless communications system, and more particularly to a method of allocating and limiting the use of leftover resources in orthogonal frequency division multiplexing (OFDM) and orthogonal frequency division multiple access (OFDMA) communications systems.

BACKGROUND

In a wideband wireless communications system, the signal tends to decrease from the frequency selective fading due to multi-path transmissions. An orthogonal frequency division multiple access (OFDMA) system has thus been proposed to overcome the problem of frequency selective fading by dividing the total bandwidth into a plurality of sub-carriers, such that the bandwidth on each sub-carrier is sufficiently narrow.

The OFDMA systems use an OFDMA modulation technique to multiplex the traffic data of a plurality of mobile stations in both frequency and time. Typically, OFDMA systems are used on both voice and (packet) data communications. Such a wireless network typically involves transmissions of packet data and voice over IP (VoIP) traffic between access networks (AN) and access terminals (AT). The efficient management of voice and data users thus becomes essential to the respective wireless communications network.

Voice traffic, while being a part of a real-time application, is usually discontinuous in nature and comprises large inactive periods. It is often desired to group a number of voice users together and assign them with a set of shared time-frequency resources. The statistical multiplexing gain is achieved among the group members. For example, when the base station has determined a discontinuous transmission (DTX) state for a user in a particular time period, it can assign the user's transmission (e.g., time and/or frequency) resources to another user. The statistical multiplexing gain is also achieved through the early-terminated hybrid automatic request (HARQ) transmissions. For example, once a user acknowledges its VoIP packet, the time and/or frequency resources become available to other group members based on the implemented scheduling algorithm.

In the past, various conventional techniques have been proposed to allow unused transmission resources to be allocated to other users for voice communication. For example, such technique has been proposed in the third generation partnership project 2 (3GPP2).

According to a conventional technique, a unique identifier (e.g., GroupID) is assigned to a group when the group is established. When the AN assigns an AT to the group, the AN associates the AT's unique identifier (e.g., MACIndex) to the GroupID through a group setup message. The message is managed through upper layer signaling carried on a forward link data channel (F-DCH).

The group setup message defines the exact locations of the resource blocks and an order in which the resources are allocated. In the time domain, the set of shared resources is a group of VoIP frames comprising a VoIP interlace pattern. In the frequency domain, the shared resource is typically a set of distributed resource channels (DRCH), although a set of block resource channels (BRCH) could be used also.

Each AT is assigned a unique ordering index within the group, and a fixed interlace offset within a super-frame for its first sub-packet transmission. This is to align the time between successive first transmissions to the vocoder frame duration (e.g., approximately 20 msec).

Once a group of users is established and assigned a set of shared time-frequency resources, a group resource allocation message that uses bitmap signaling is utilized to assign resources to individual users in each VoIP frame. The bitmap signaling is used by base stations to assign resources and by the users to determine their exact resources within the set of shared time-frequency resources. It is used for first sub-packet and subsequent retransmissions.

In conventional OFDMA networks, at any time, most likely, only some of the ATs are active, and hence the group resources assigned to the respective group may not be fully used. Particularly, in a lightly loaded resource group, most of the group resources may be idle. A solution is thus needed to utilize the idled resource groups efficiently.

SUMMARY OF THE INVENTION

In accordance with one aspect of the present invention, a method for resource allocation in a wireless communications network includes providing an access network (AN); providing an access terminal (AT); joining the AT into a group of the AN, wherein ATs in the group share a group of resources; and setting a maximum usable channel size for the AT, wherein the maximum usable channel size limits a maximum number of leftover resources used by the AT.

In accordance with another aspect of the present invention, a method for resource allocation in a wireless communications network includes providing an AN; providing first ATs, wherein the first ATs are in a group sharing a set of resources, and wherein the first ATs use a group of selected resources and leave leftover resources unused; providing a second AT; setting a maximum usable channel size for the second AT, wherein the maximum usable channel size limits a maximum number of leftover resources used by the second AT; and sending a data frame to the second AT. The data frame includes an AT present bitmap indicating statuses of the first ATs, wherein a status of the second AT is not indicated in the AT present bitmap; and an additional bitmap selected from a resource availability bitmap and an allocation size bitmap, wherein the additional bitmap includes information of the leftover resources; and an identifier indicating the data frame is intended for the second AT.

In accordance with yet another aspect of the present invention, a method for resource allocation in a wireless communications network includes providing an AN; providing first ATs, wherein the first ATs are in a group sharing a set of resources, and wherein the first AT use a group of selected resources and leave leftover resources unused; providing a second AT; assigning a first priority to the first ATs, and a second priority to the second AT, wherein the second priority is lower than the first priority in the usage of the set of resources; reporting a maximum decoding bandwidth of the second AT to the AN; selecting a maximum usable channel size, wherein the maximum usable channel size is no greater than the maximum decoding bandwidth, and indicates a maximum number of leftover resources that can be used by the second AT; and sending a group assign message from the AN to the second AT to notify the second AT of the maximum usable channel size.

In accordance with yet another aspect of the present invention, a wireless communications system includes an AN; first ATs configured to perform communication through the AN; and a second AT configured to perform communication through the AN. The AN is configured to assign a set of resources to the first ATs; allocate leftover resources unused by the first ATs to the second AT; and set a maximum usable channel size for the second AT.

By allocating and limiting the use of leftover resources in the group, the group resources are used more efficiently.

The foregoing has outlined rather broadly the features and technical advantages of the present application in order that the detailed description of the present application that follows may be better understood. Additional features and advantages of the embodiments will be described hereinafter which form the subject of the claims of the present application. It should be appreciated by those skilled in the art that the conception and specific embodiments disclosed may be readily utilized as a basis for modifying or designing other structures or processes for carrying out the same purposes of the present application. It should also be realized by those skilled in the art that such equivalent constructions do not depart from the spirit and scope of the present application as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
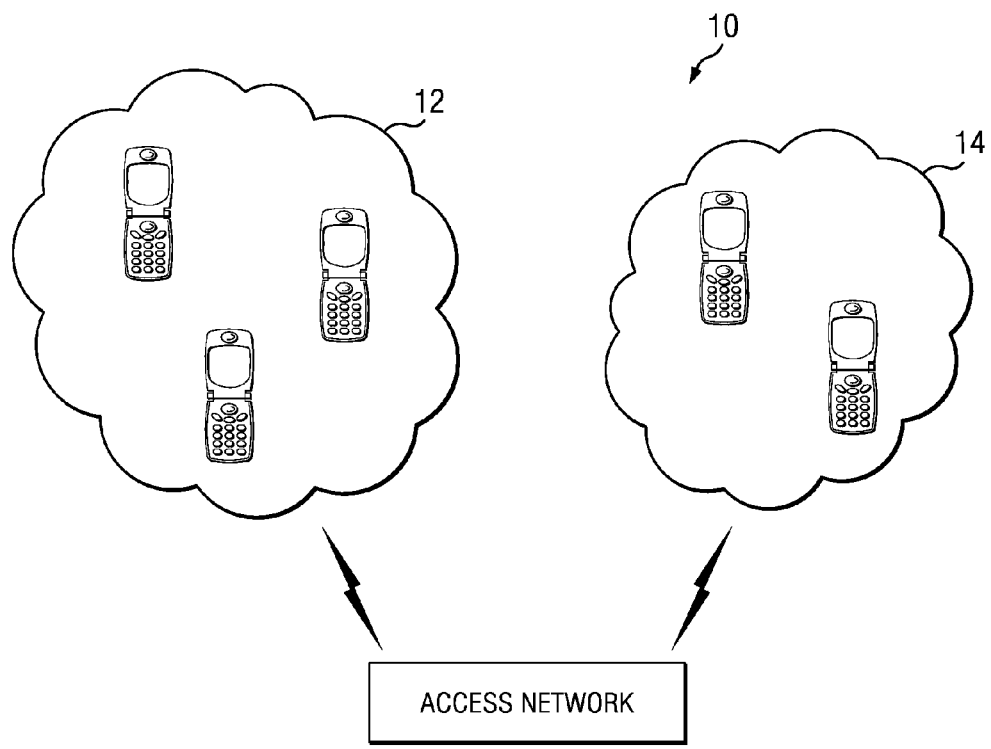
FIG. 1 illustrates a wireless communication network, wherein a plurality of ATs sharing a group of resources communicates through an access network.

FIG. 1 illustrates wireless network 10, which may be an orthogonal frequency division multiple access (OFDMA) network. Wireless network 10 includes various elements, such as an access network (AN), a plurality of ATs (AT) 12 and 14, and the like. The plurality of ATs is wirelessly connected to the AN, which may go through base stations (not shown) as parts of the AN. Preferably, the AN is configured to provide both voice and data communication. The plurality of ATs may include mobile phones for the voice communication, and other types of terminals for the data communication. The plurality of ATs may be categorized into two categories, ATs 12 and ATs 14, which are allocated with resources in different ways, as will be discussed in detail in subsequent paragraphs. However, the ATs 12 and ATs 14 both belong to a same (scheduling) group sharing a common set of time and/or frequency resources (alternatively referred to as time-frequency resources, resources, or channels, hereinafter), for example, channels. In the time domain, the shared resources are a group of data frames. In the frequency domain, the shared resources are typically a set of distributed resource channels, although they can also be a set of block resource channels. ATs 14 can only use the leftover resources that are not used by ATs 12. Accordingly, ATs 14 often, although not always, have a lower priority than ATs 12. In an exemplary embodiment, ATs 12 are mobile phones for the voice communication, while ATs 14 are terminals conducting packet data communication with the AN. The allocation of the time-frequency resources to each member AT in the scheduling group may be controlled using bitmap signaling.

As ATs 12 often cannot use all the resources shared by the group, ATs 14 may be allocated with the leftover resources. ATs 14, unlike ATs 12, are not indicated by bits in an AT present bitmap, as will be discussed in detail in subsequent paragraphs. Instead, each AT 14 is assigned a unique mini MAC ID, which may be appended to the AT present bitmap as a field. The AN can schedule ATs 14 to use the leftover resources in the group by setting the Mini MAC ID field in bitmaps. AT 14 monitors the bitmaps to determine the available leftover resources in the group as well as the mini MAC ID. Once it finds the mini MAC ID belongs to itself, the AT 14 begins its decoding attempt using the leftover resources available to it.

In an embodiment of the invention, before AT 14 can join the group and use the leftover resources of the group, AT 14 needs to report its capability for decoding the leftover channels in the group to the AN. The report and the respective acknowledgement from the AN are preferably sent at the session negotiation stage, for example, as a part of attribute configuration through the configuration request and the response between AT 14 and the AN. Once the negotiation is finished, this encoding capability will be stored as an attribute in the AN. The report may include the maximum decoding bandwidth (or channel size, for example, the number of time-frequency blocks or the bandwidth in the OFDMA system) it can support in the group sharing scheme. Throughout the description, the term "maximum decoding bandwidth" may refer to the number (size) of channels, or the corresponding total bandwidth of the referred channels, depending on the context. The maximum decoding bandwidth is related to a certain modulation and coding scheme (MCS). Typically, AT 14 can support more channels in a low MCS than in a high MCS. Accordingly, AT 14 preferably lists the maximum decoding bandwidth for a variety of MCSs it supports. The maximum decoding bandwidth of AT 14 may change if the same AT is used differently, for example, as AT 12. The report provided by AT 14 may be the same as a regular capability report, for example, one provided at the power up stage. The AN should acknowledge the report and store the maximum decoding bandwidth of AT 14 for future use.

The AN may limit the maximum size of leftover resources available to AT 14, which limitation may attribute to the capability of the AN or the AT. Through signaling, this limitation becomes commonly known information for both AT 14 and the AN. An embodiment is described as follows. To put AT 14 into the group and allow it to share the leftover resources, a Group Assignment Message is sent from the AN to configure the parameters of the group and AT 14. In this message, the maximum usable channel size, which is the maximum number of resources AT 14 is allowed to use, is indicated as a field. The maximum usable channel size has an upper limit equal to the maximum decoding bandwidth. However, the AN may also want to set the maximum usable channel size to be lower than the maximum decoding bandwidth. In an exemplary embodiment of an OFDMA-based communications system, the method for indicating the maximum usable channel size is as follows: the AN sets this field to the maximum number of resources that can be used by the AT 14, and set the mini MAC index of the respective AT 14 in the MiniMACIndex footer, irrespective of the actual number of unused leftover resources might be. An encoding of this field is illustrated in Table 1, although other encoding schemes may also be used:

TABLE 1

| Field value (Binary) | Maximum Usable Channel Size |
|---|---|
| '000' | 4 |
| '001' | 8 |
| '010' | 16 |
| '011' | 32 |
| '100' | 64 |
| '101' | 96 |
| '110' | 128 |
| '111' | Unlimited |

The maximum usable channel size may be indicated implicitly. If the maximum usable channel size is already the common information for AT 14 and the AN, which may have been set in the above-discussed session negotiation stage, or specified by the protocol commonly known to the AN and AT 14, the maximum usable channel size of AT 14 does not have to appear in the Group Assignment Message. In this case, both the AN and AT 14 will follow the rule that AT 14 shall not use more resources than indicated by the maximum usable channel size.

After reading the bitmap signaling, which may include bitmaps such as an AT present bitmap (with a mini MAC ID field indicating the mini MAC ID of AT 14), and an allocation size bitmap (a packet format bitmap) or a resource availability bit-map, the AT 14 assumes it is the intended user. Since AT 14 can also find the available leftover resources through the bitmaps, AT 14 may compare the size of the available leftover resources with the maximum usable channel size. If the size of the available leftover resources is smaller than the maximum usable channel size, AT 14 will try to decode the data in all of the available leftover resources (channels). Otherwise, AT 14 will only try to decode the data in certain channels with the maximum usable channel size, which is less than the total number of the leftover resources unused by AT 12. In this case, a pre-defined pattern is needed for AT 14 to choose channels for decoding from the available leftover resources. In an embodiment of the present invention, the decoded channels are selected from the available leftover resources in an ascending order of channel IDs. For example, for a certain transmission interval, there are 20 channels left unused, with the channel IDs ranging from 10 to 29, and AT 14 has a maximum usable channel size of 10. Following the ascending pattern, both the AN and AT 14 may determine if the data should be carried on channels with IDs ranging from 10 to 19, and hence AT 14 will decode channels 10-19. Alternatively, the decoded channels are selected from the available leftover resources in the descending order, or any other pre-defined orders, of the channel IDs. This order can be pre-defined in the protocol or can be carried in the signaling, such as in the group assignment message as a parameter.

In the case the size of the available leftover resources is greater than the maximum usable channel size of AT 14, there will be some excess leftover resources, which are the leftovers of the leftover resources after AT 14 has taken its resources. The size of the excess leftover resources equals the total size of the leftover resources minus the maximum usable channel size of AT 14. The excess leftover resources can be assigned to AT 14 through signaling. In an embodiment of the present invention, forward link assignment message (FLAM) is used to assign the excess leftover resources.

If the synchronized and the non-adaptive hybrid automatic repeat request (HARQ) are adopted, the resources used for the retransmission are preferably the same resources as used in the original transmissions. This puts some constraint on the scheduler, because the same excess leftover resources need to be available for the retransmission as in the original transmission. However, this constraint is not too stringent because the occurrence of the excess leftover resources implies the group is lightly loaded. Therefore, it is likely to have a big number of resources left unused in the next interval. Moreover, the size of the retransmission can be changed by signaling, and hence the constraint on the scheduler may be released with the price of signaling overhead. One embodiment of changing the resources for the retransmission is through supplementary FLAM.

The assignment of the excess leftover resources may also be performed using superposed FLAM (SPFLAM). The SPFLAM is usually accompanied with a resource availability message (RAM), which indicates the availability of the resources, and basically is a bitmap with each bit position corresponding to a channel. In this case, the leftover resources taken by AT 14 are marked as unavailable in the RAM, so that the intended receiver of the SPFLAM knows the excess leftover resources in the group. In other words, in this embodiment, the AN first schedules AT 14 in the group to take the leftover resources as much as possible, up to the maximum usable channel size. If there are still excess leftover resources left, the AN will mark the resources taken by AT 14 as unavailable and the resource of excess leftover resources as available in the RAM, and use the SPFLAM to assign the excess channel to another user. The user intended by the SPFLAM accordingly resorts the RAM to know which resources it may take to ensure no conflict between the AT 14 and the user occurs.

In another embodiment of present invention, bitmaps are used to assign the excess leftover resources within the group. Again, the occurrence of excess leftover resources implies the group is lightly loaded. Therefore, the bitmap for the group may have a lot of bits unused. In this case, the meaning of the unused part of bitmaps may be interpreted as the indication of the excess channel.

The leftover resources may be assigned to AT 14 in various ways. In a first embodiment of the present invention, a resource available bitmap (RAB) is used. The AN may decide to allow AT 14 to use as much as possible leftover resources, up to the maximum usable channel size. Alternatively, the AN may decide to reserve some of the leftover resources for other usages, while only assign a portion of the leftover resources to AT 14. In this embodiment, the AN simply marks the resources that the AN does not want to assign to AT 14 as occupied in the RAB. By reading the RAB, AT 14 may determine the available (partial) leftover resources assigned to itself. Therefore, although the actual leftover resources may be more, AT 14 (through the mini Mac index) will only know the available leftover resources assigned to it.

Figure 2:
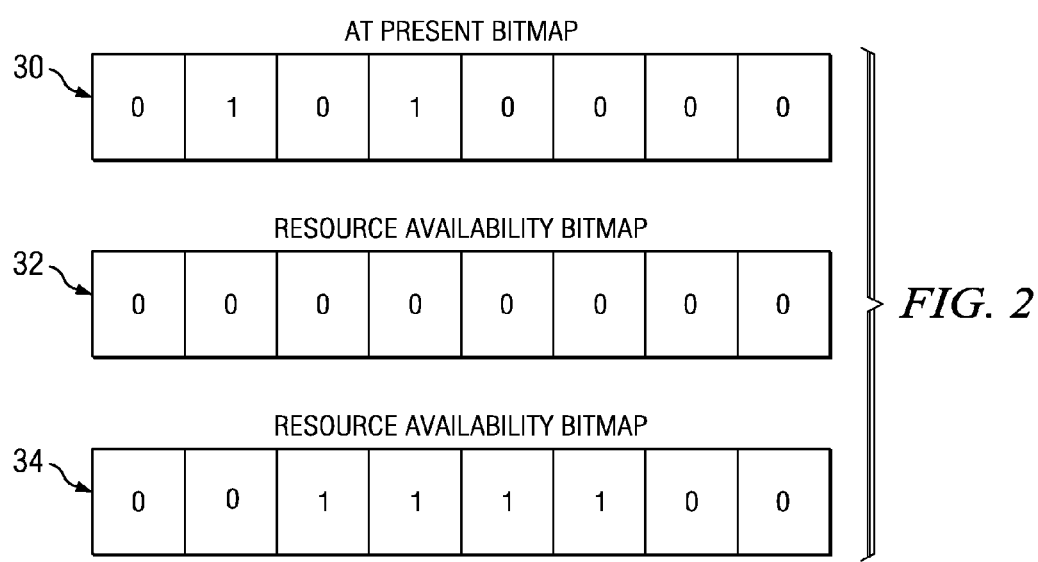
FIG. 2 illustrates an exemplary embodiment for indicating available leftover resources using a resource availability bitmap.

Examples for using bitmaps to assign and limit the use of leftover resources are illustrated in FIG. 2. AT present bitmap 30 is used to indicate which ATs 12 (refer to FIG. 1) in the group will have a new packet transmission in this time interval. Each bit in AT present bitmap 30 is associated with an AT 12 in the group. A "1" bit in AT present bitmap 30 indicates that the corresponding AT 12 has a new packet transmission, while a "0" bit indicates that the corresponding AT 12 does not have any new packet transmission. In the following discussions, the AT 12 associated with the first "1" bit in AT present bitmap 30 is referred to as the new packet mobile 1, and the AT 12 associated with the second "1" bit in AT present bitmap 30 is referred to as the new packet mobile 2, and so on. Bitmap 32 is a RAB, and has a one-to-one mapping to the time-frequency resources (for example, channels) shared by the group. A "1" bit in RAB indicates that the respective resource is currently being used, while a "0" bit indicates that the respective resource is not being used. A data frame sent from the AN will include AT present bitmap 30, RAB 32, and the mini MAC ID of the intended AT 14 (refer to FIG. 1).

Assuming the AN decides to allow (the intended) AT 14 to use all leftover resources it can use, then RAB 32 is transmitted in the data frame along with AT present bitmap 30. By looking at RAB 32, the new packet mobile 1 knows that the first unused resource will be assigned to it. Similarly, the new packet mobile 2 knows that the second unused resource will be assigned to it, and so on. In the example shown in FIG. 2, there are two new active packet mobiles in AT present bitmap 30 and 8 available channels in RAB 32. Two new active packet mobiles 1 and 2 will take the first two available channels, which are channels 1 and 2 in the bitmap. At this time, the leftover resources only include 6 channels with channel IDs 2 through 8, as shown in RAB 32. Accordingly, an AT 14 that has a four-channel decoding capability, by reading RAB 32, will use channels 3, 4, 5, and 6, providing an ascending pattern is followed.

If, however, the AN intends to assign only channels 7 through 8 to AT 14 (with a four-channel decoding capability), then the AN may mark channels 3 through 6 as used in RAB 34, and send RAB 34 instead of RAB 32. Consequently, AT 14 looks at AT present bitmap 30 as well as RAB 34 and knows there are two new packet mobiles taking two available channels, and there are four additional channels already being used. Then the leftover resources available to the receiving AT 14 include two channels with channel IDs 7 and 8. In this case, the AN has limited the available leftover resources to AT 14.

Figure 3:
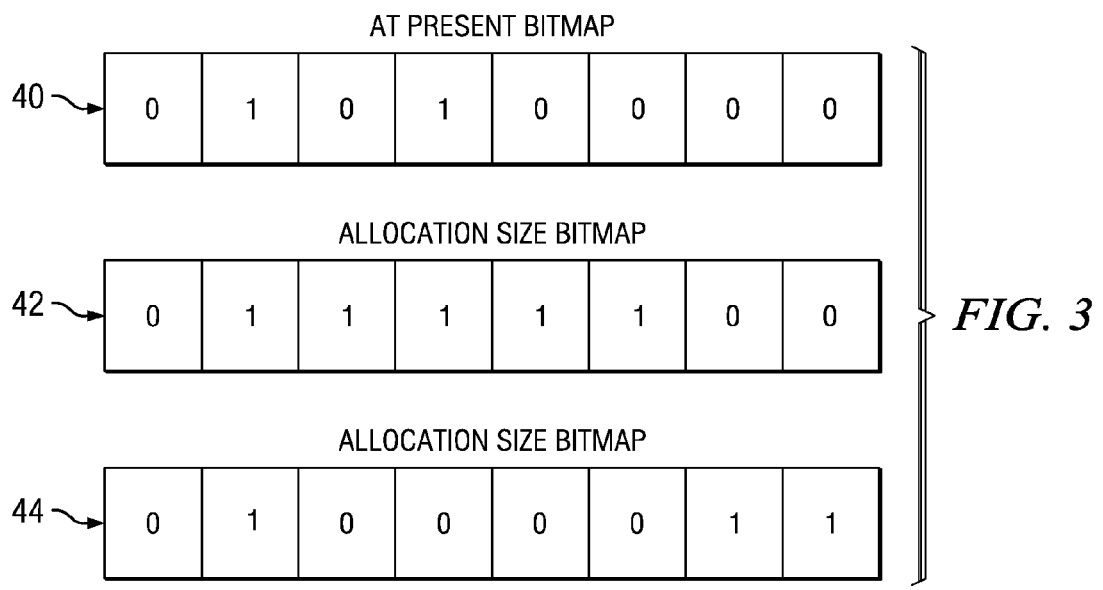
FIG. 3 illustrates an exemplary embodiment for indicating the available leftover resources using a allocation size bitmap, wherein the available leftover resources are indicated as bits in the allocation size bitmap.

In another embodiment of assigning and limiting the leftover resources to AT 14, as shown in FIG. 3, an allocation size bitmap 42 (ASB, also sometimes referred to as packet format bitmap (ASPFB)) is used. In this embodiment, the ASB 42 is used with a mixed mode, with a first portion of the ASB 42 indicating the number of the channels used by each of the active ATs 12, and a second portion of the ASB indicating the available leftover resources that can be assigned to AT 14, which is again an intended user of the respective data frame.

Similar to AT present bitmap 30, AT present bitmap 40 will be used to indicate which ATs 12 are being served in the respective data frame. Each bit of AT present bitmap 40 corresponds to an AT 12 in the scheduling group. An AT 12 is active, i.e. being sent data, if its corresponding bit is set to "1." Conversely, an AT 12 is inactive, i.e., not being sent data, if its corresponding bit is set to The first portion of ASB 42 is used to indicate the time-frequency resources being allocated to each active AT 12. The first bit of ASB 42 corresponds to the first active user (referred to as active user 1 hereinafter) in AT present bitmap 40, the second bit of ASB 42 corresponds to the second active user (referred to as active user 2 hereinafter), and the third bit of ASB 42 corresponds to the third active user (referred to as active user 3), and so on. The time-frequency resources will be allocated consecutively from the active user 1 to the last active user, and indicated by consecutive bits in the first portion of ASB 42. A "1" bit in ASB 42 will indicate that M (for example, 2) time-frequency resources will be assigned to the respective AT 12, while a "0" bit will indicate N (for example, 1) time-frequency resources will be assigned to the respective AT 12. The integers M and N may be pre-defined as commonly accepted information between the AN and ATs, or defined by the protocol.

In the exemplary embodiment shown in FIG. 3, there are two ATs being served, with the active user 1 using one channel and the active user 2 using two channels. Given there are 8 channels in the group, the leftover resources include 5 channels. With the channel ordered in the ascending pattern, the leftover channels are channels 4, 5, 6, 7, and 8. If the AN intends to assign only 4 channels to the data AT, the AN may mark 4 bits in the second portion of ASB 44 as "1," with each "1" bit indicating an available leftover channel. In this example, the first two bit positions of ASB 42 correspond to the active ATs indicated in AT present bitmap 40, and therefore are occupied. The second portion of ASB 42 thus includes bits 3 through 8. Since active user 2 takes two channels, active users 1 and 2 in combination take three channels, and hence the third bit in the ASB 42 corresponds to the fourth channel (channel ID =4) in the group (note, the first channel has channel ID 1). A "1" in the second portion of ASB 44 indicates the channel is available to use for the intended AT 14. Conversely, a "0" in the second portion of ASB 44 indicates the channel is not available to use for the intended AT 14. Referring to ASB 42, the first, second, third, and fourth bits in the second portion of ASB 42 (which are the third, fourth, fifth, and sixth bits of ASB 42) are marked as "1," indicating channels 4, 5, 6, and 7 are available for the intended AT 14, which recognizes that the data frame is intended for itself through the reading of the mini MAC ID. Accordingly, the intended AT 14 may look at the AT present bitmap 40 and ASB 42 to know where the second portion of ASB 42 starts and the mapping between the bit positions in the second portion of ASB 42 and the time-frequency resources (channels). By counting the ones in the second portion of ASB, the intended AT 14 knows the available leftover resources for it.

In another exemplary embodiment, if the AN intends to limit the intended AT 14 to use only two channels, the AN may create ASB 44, marking channels 4, 5, and 6 (which correspond to bits 3, 4, 5, and 6, respectively) as "0" (not available) and channels 7 and 8 as "1" (available), so that the intended AT 14 will know it can only use channels 7 and 8, although it may have a four-channel encoding capability. In this case, the AN has limited the available leftover resources to AT 14.

Figure 4:
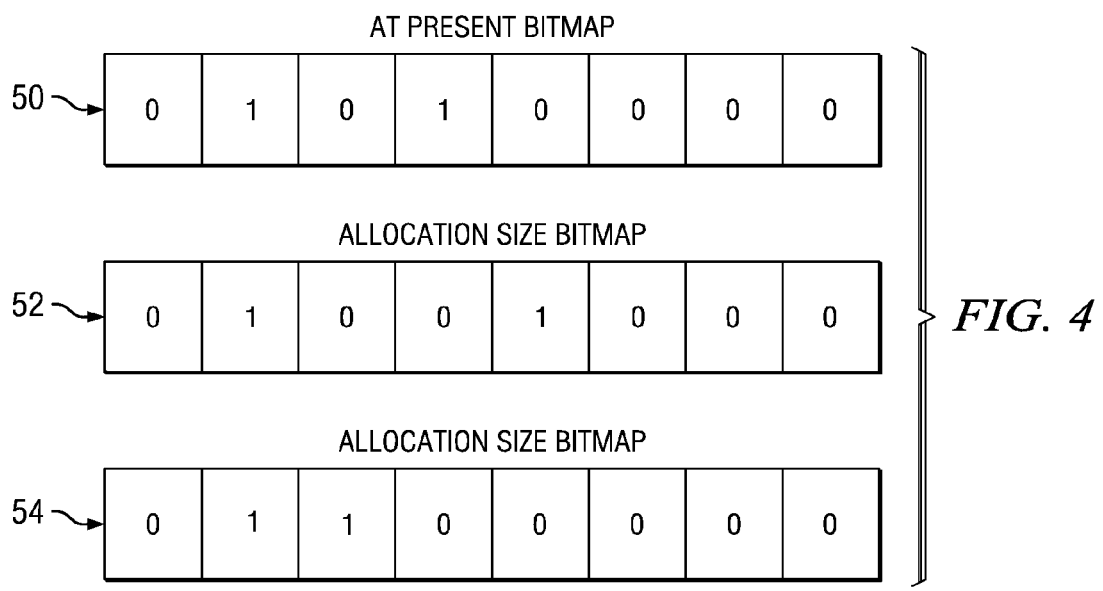
FIG. 4 illustrates an alternative exemplary embodiment for indicating the available leftover resources through the allocation size bitmap, wherein the size of the available leftover resources is indicated in the allocation size bitmap.

In yet another embodiment of the invention for assigning and limiting the size of the available leftover resources, as illustrated in FIG. 4, another ASB 52 is used in combination with an AT present bitmap 50. In this case, however, ASB 52 has a different meaning as shown in FIG. 3. AT present bitmap 50 has essentially the same meaning as bitmaps 30 and 40. Again, the ASB 52 in this embodiment has a mixed mode, with a first portion of ASB 52 indicating the sizes of the resources used by each of the active ATs 12, and a second portion of the ASB 52 indicating the available leftover resources that can be assigned to AT 14, which is again an intended user of the respective data frame. However, the second portion of ASB 52 carries the size of the available leftover resources, instead of marking the bits of available channels. In an embodiment of the present invention, the size of the available leftover resources is indicated using three bits, which preferably starts from the first bit of the second portion of ASB 52 (which is the third bit of ASB 52), and includes the third, the fourth and the fifth bits of ASB 52. In an exemplary embodiment, the least significant bit (LSB) of the size field is put in the first bit of the second portion of ASB 52. If the assigned leftover resource size is 4, or "100" in binary, then the LSB "0" is carried on the third bit of the ASB 52, and the MSB "1" is carried on the fifth bit of ASB 52. Since bit "000" is meaningless if it is interpreted as size of 0 channels, the size of available leftover resources may start from 1 with "000" representing size of 1. Accordingly, the available leftover resources to the intended AT 14 include 5 ("100"+1) channels. In alternative embodiments, the MSB and the LSB may be at the third and the fifth bits, respectively, as is shown in ASB 54. One skilled in the art will realize that the concept of the present invention may be applied using a packet format bitmap.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for resource allocation in a wireless communications network comprising an access network and an access terminal, the method comprising:
   joining the access terminal into a group of the access network, wherein access terminals in the group share a group of resources; and
   setting a maximum usable channel size for the access terminal, wherein the maximum usable channel size limits a maximum number of leftover resources used by the access terminal, and wherein the step of setting the maximum usable channel size comprises:
      receiving a report of a maximum decoding bandwidth of the access terminal by the access network;
      selecting the maximum usable channel size, wherein the maximum usable channel size is not greater than the maximum decoding bandwidth; and
      sending a message from the access network to the access terminal to set the maximum usable channel size, wherein the maximum usable channel size is specified using a table known by the access network and the access terminal, and wherein the table comprises one-to-one mapping between the maximum usable channel size and a field in the message.

2. The method of claim 1, wherein the message from the access network is a group assignment message, and wherein the maximum usable channel size is a field in the group assignment message.

3. The method of claim 1 further comprising:
   sending a data frame from the access network to the access terminal, wherein the data frame specifies available leftover resources of the group; and
   decoding a selected portion of resources in the available leftover resources of the group, wherein the step of decoding is performed by the access terminal, and wherein a size of the selected portion of the resources is no greater than the maximum usable channel size.

4. The method of claim 3, wherein the available leftover resources has a size smaller than the maximum usable channel size, and wherein the access terminal decodes all of the available leftover resources.

5. The method of claim 3, wherein the available leftover resources has a size greater than the maximum usable channel size, and wherein the access terminal decodes a portion of the available leftover resources having a size equal to the maximum usable channel size.

6. The method of claim 3, wherein the data frame comprises an access terminal (AT) present bitmap and an additional bitmap selected from a resource availability bitmap and an allocation size bitmap, wherein the additional bitmap specifies the available leftover resources.

7. The method of claim 6, wherein the available leftover resources are less than actual leftover resources unused by access terminals specified in the AT present bitmap.

8. The method of claim 1, wherein the maximum usable channel size is pre-set in a protocol accepted by the access network and the access terminal.

9. A method for resource allocation in a wireless communications network comprising an access network and first access terminals, wherein the first access terminals are in a group sharing a set of resources, and wherein the first access terminals use a group of selected resources and leave leftover resources unused, the method comprising:
   joining a second access terminal into the group;
   receiving a report of a maximum decoding bandwidth of the second access terminal by the access network from the second access terminal;
   setting a maximum usable channel size for the second access terminal, wherein the maximum usable channel size limits a maximum number of leftover resources used by the second access terminal; and
   after the step of setting the maximum usable channel size, sending a data frame to the second access terminal, wherein the data frame comprises:
      an access terminal (AT) present bitmap indicating statuses of the first access terminals, wherein a status of the second access terminal is not indicated in the AT present bitmap; and
      an additional bitmap selected from a resource availability bitmap and an allocation size bitmap, wherein the additional bitmap comprises information of the leftover resources; and
      an identifier indicating the data frame is intended for the second access terminal.

10. The method of claim 9, wherein the step of setting the maximum usable channel size comprises:
selecting the maximum usable channel size by the access network, wherein the maximum usable channel size is no greater than the maximum decoding bandwidth; and
sending a group assign message from the access network to the second access terminal to set the maximum usable channel size.

11. The method of claim 9 further comprising decoding a selected portion in the leftover resources by the second access terminal, wherein the selected portion has a size no greater than the maximum usable channel size.

12. The method of claim 11 further comprising allocating excess leftover resources unused by the second access terminal to an additional access terminal, wherein the additional access terminal is not indicated in the AT present bitmap.

13. The method of claim 9, wherein the step of setting the maximum usable channel size is performed at a session negotiate stage of the second access terminal.

14. The method of claim 9, wherein the resource availability bitmap includes one-to-one mapping of the set of resources shared by the group, and wherein a first portion of the resource availability bitmap indicates the group of selected resources used by active ones of the first access terminals, and wherein a second portion of the resource availability bitmap is marked to indicate resources in the leftover resources available to the second access terminal.

15. The method of claim 14, wherein the resources available to the second access terminal have a number less than the leftover resources.

16. The method of claim 9, wherein the allocation size bitmap includes a first portion and a second portion, and wherein the first portion includes bits indicating numbers of resources used by each of active first access terminals, and wherein the second portion includes additional bits indicating a portion of the leftover resources available to the second access terminal.

17. A method for resource allocation in a wireless communications network comprising an access network, first access terminals, and a second access terminal, wherein the first access terminals are in a group sharing a set of resources, and wherein the first access terminals use a group of selected resources and leave leftover resources unused, the method comprising:
assigning a first priority to the first access terminals, and a second priority to the second access terminal, wherein the second priority is lower than the first priority in the usage of the set of resources;
receiving a report of a maximum decoding bandwidth of the second access terminal by the access network from the second access terminal;
selecting a maximum usable channel size, wherein the maximum usable channel size is no greater than the maximum decoding bandwidth, and indicates a maximum number of leftover resources that can be used by the second access terminal; and
sending a group assign message from the access network to the second access terminal to notify the second access terminal of the maximum usable channel size.

18. The method of claim 17 further comprising:
sending an additional message from the access network to the second access terminal to change the maximum usable channel size.

19. The method of claim 17, wherein the first access terminals are voice users, and the second access terminal is a data user.

20. The method of claim 17 further comprising:
sending a data frame to the second access terminal, wherein the data frame comprises:
an access terminal present (AT) bitmap indicating statuses of the first access terminals, wherein a status of the second access terminal is not indicated in the AT present bitmap; and
an additional bitmap selected from a resource availability bitmap and an allocation size bitmap, wherein the additional bitmap comprises information of the leftover resources; and
an identifier indicating the data frame is intended for the second access terminal.

21. The method of claim 17, wherein the first access terminals and the second access terminal are members of the group sharing the set of resources.

22. A wireless communications system comprising:
an access network;
first access terminals configured to perform communication through the access network;
a second access terminal configured to perform communication through the access network and to send a report of a maximum decoding bandwidth of the second access terminal to the access network; and
wherein the access network is configured to:
assign a set of resources to the first access terminals;
allocate leftover resources unused by the first access terminals to the second access terminal;
receive the report of the maximum decoding bandwidth of the second access terminal from the second access terminal; and
set a maximum usable channel size for the second access terminal, with the maximum usable channel size being set to no greater than the maximum decoding bandwidth of the second access terminal.

23. The wireless communications system of claim 22, wherein the first access terminals are voice users, and the second access terminal is a data user.

24. The wireless communications system of claim 22, wherein the access network is configured to send a data frame to the second access terminal, wherein the data frame comprises:
an access terminal (AT) present bitmap indicating statuses of the first access terminals, wherein a status of the second access terminal is not indicated in the AT present bitmap;
an additional bitmap selected from a resource availability bitmap and an allocation size bitmap, wherein the additional bitmap comprises information of the leftover resources; and
an identifier indicating the data frame is intended for the second access terminal.

25. The wireless communications system of claim 24, wherein the second access terminal is configured to:
read the AT present bitmap and the additional bitmap to determine available leftover resources; and
determine a selected portion of leftover resources to decode, wherein the selected portion has a size equal to a smaller one of the maximum usable channel size and a size of the available leftover resources.

26. The wireless communications system of claim 24, wherein the access network is configured to allocate excess resources in the leftover resources unused by the second access terminal to an additional second access terminal, and wherein an additional status of the additional second access terminal is not indicated in the AT present bitmap.

27. The wireless communications system of claim 22, wherein the second access terminal has a lower priority than the first access terminals.

\* \* \* \* \*